United States Patent [19]
Ioannides et al.

[11] Patent Number: 5,316,179
[45] Date of Patent: May 31, 1994

[54] SYSTEM FOR DISPENSING A KNOWN VOLUME OF FLUID

[75] Inventors: Antonis C. Ioannides; James S. Wilson, both of Abingdon; Ashok Patel, Littlemore, all of United Kingdom

[73] Assignee: Oxford Glycosystems Limited, Abingdon, United Kingdom

[21] Appl. No.: 837,897

[22] Filed: Feb. 20, 1992

[30] Foreign Application Priority Data

Feb. 28, 1991 [GB] United Kingdom ............... 9104226

[51] Int. Cl.$^5$ ............................................. B67D 5/08
[52] U.S. Cl. ............................................ 222/56; 222/61; 406/19; 406/31; 406/50
[58] Field of Search ................. 222/56, 61, 52, 399, 222/424.5, 641, 1; 141/67, 94, 192, 198; 406/3, 19, 31, 50, 131, 142, 148, 183; 422/100, 103

[56] References Cited

U.S. PATENT DOCUMENTS

| | | | |
|---|---|---|---|
| 3,347,418 | 10/1967 | Fefferman | 222/399 |
| 3,653,543 | 4/1972 | Prakschat | 222/52 |
| 3,812,890 | 5/1974 | Haas et al. | 141/92 |
| 4,029,365 | 6/1977 | Ahrens et al. | 222/56 |
| 4,462,760 | 7/1984 | Sarich et al. | 417/54 |
| 4,649,028 | 3/1987 | Kalterbach et al. | 422/100 |
| 4,779,762 | 10/1988 | Klein et al. | 222/52 |
| 4,873,057 | 10/1989 | Robertson et al. | 422/103 |
| 4,903,862 | 2/1990 | Shanon et al. | 222/61 |
| 5,046,925 | 9/1991 | Fletcher | 417/138 |
| 5,072,853 | 12/1991 | Shannon | 222/1 |
| 5,133,391 | 7/1992 | Johansson et al. | 222/1 |

FOREIGN PATENT DOCUMENTS

0124978 11/1984 European Pat. Off. .
1205590 9/1970 United Kingdom .

Primary Examiner—Andres Kashnikow
Assistant Examiner—Philippe Derakshani
Attorney, Agent, or Firm—Spencer, Frank & Schneider

[57] ABSTRACT

A system for delivering measured amounts of liquid, such as reagents used in chromatography. Liquid is first moved under gas pressure from a reservoir, such as a reagent bottle, through a valve into a narrow pipe. It reaches a detector which, detecting its presence, closes the valve thus trapping an amount of liquid between the valve and the detector, this amount of liquid then constituting a 'unit' or 'pulse' of liquid. The movement of the valve is used to connect a gas supply which drives the 'unit' or 'pulse' out of the pipe to an ultimate destination, such as a chromatographic column. A further 'unit' or 'pulse' can then be moved into the pipe and this repeated so that delivery to the destination is made in a series of such 'units' or 'pulse'. By timing the delivery of one 'unit' or 'pulse', an amount less than one 'unit' or 'pulse' can be delivered by passing liquid into the pipe for less than the time taken to deliver one 'unit'. This can be used to make up a delivery which is not a unitary multiple of one 'unit' or to deliver a small amount of less than one 'unit'. No moving parts are involved and delivery of accurately measured amounts is achieved.

14 Claims, 3 Drawing Sheets

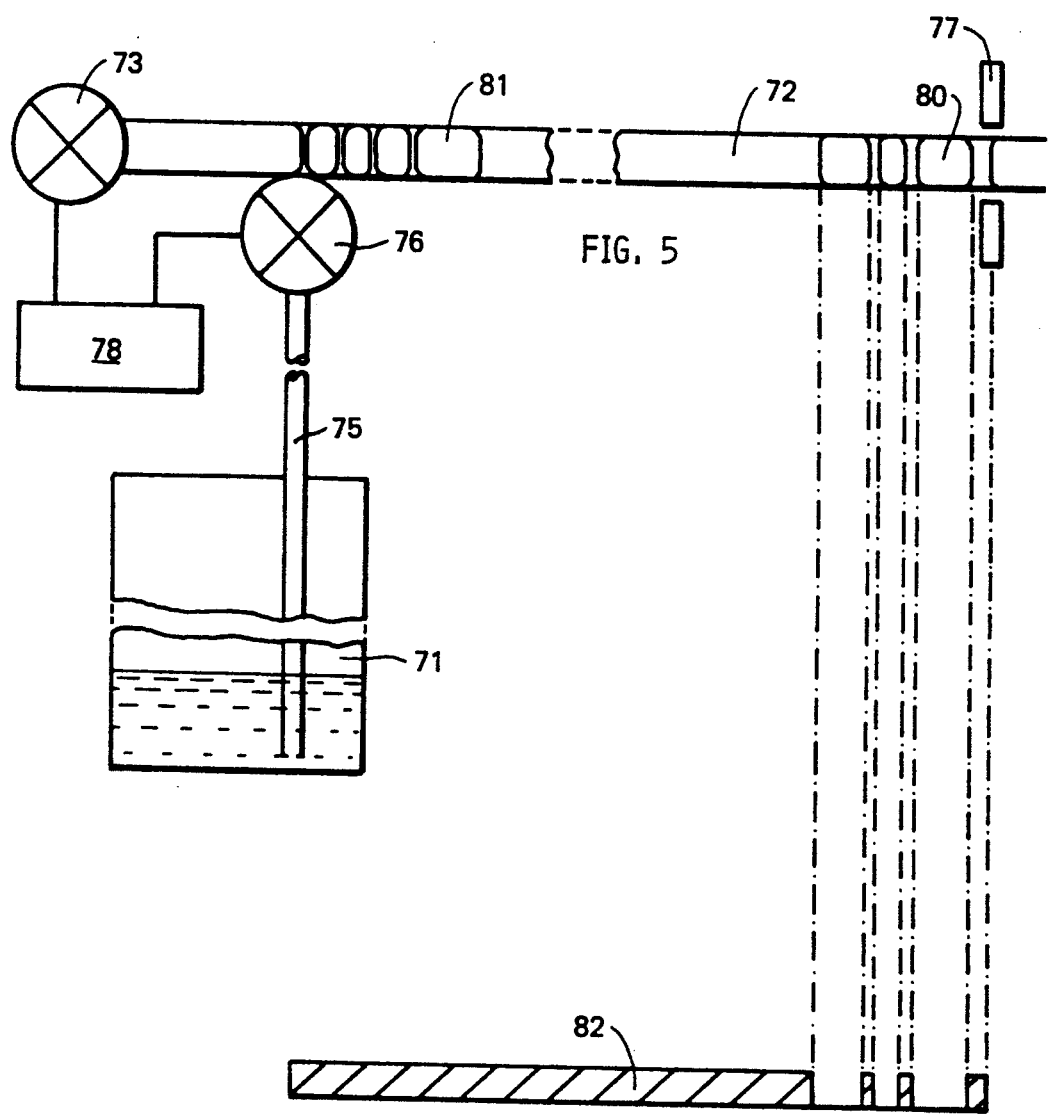

SYSTEM FOR DISPENSING A KNOWN VOLUME OF FLUID

BACKGROUND OF THE INVENTION

This invention relates to a system for dispensing or delivering a known volume of a fluid from a source of such fluid.

SUMMARY OF THE INVENTION

According to the invention there is provided a fluid delivery system comprising a fluid reservoir for containing a first fluid, a receiver, means for delivering the first fluid from said reservoir to said receiver and for controlling the amount of first fluid so delivered to a unit or pulse of said fluid, and means for supplying a required amount of first fluid to a destination, as a multiple of one such said unit or pulse.

A preferred feature of the invention is that a function of said delivery of said unit or pulse of the first fluid, such as the time taken to make the delivery, is measured and used to control delivery of part units or of amounts significantly larger than one unit.

A further feature of the invention is that the amount of first fluid displaced from the reservoir to facilitate said delivery of a unit is no more than said unit, i.e. there is waste.

BRIEF DESCRIPTION OF THE DRAWINGS

Embodiments of the invention will now be described, by way of example only, with reference to the accompanying drawings, in which.

FIG. 5 is a diagram similar to that of FIG. 4, but to a larger scale.

FIG. 6 is a step function diagram representing fluid delivery of FIG. 5.

DESCRIPTION OF THE PREFERRED EMBODIMENTS

Figure 1:
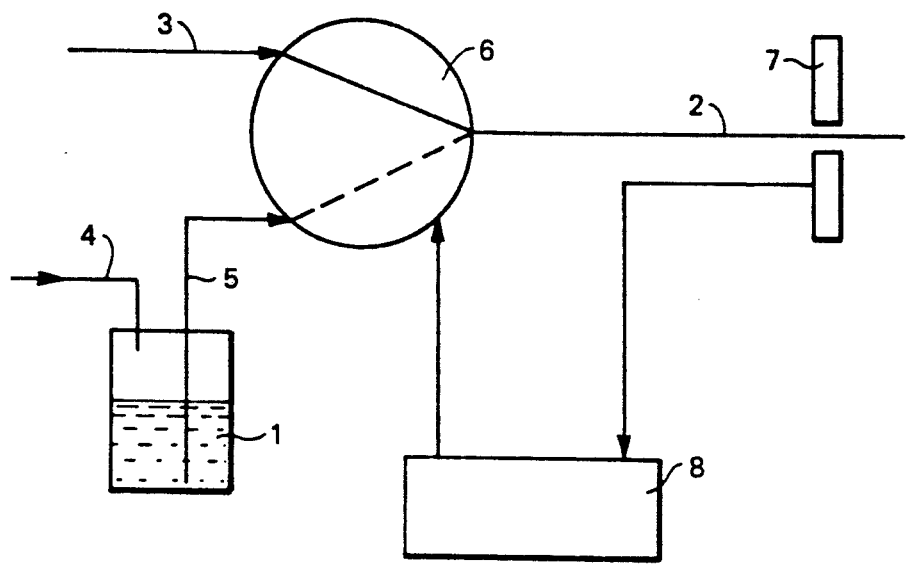
FIGS. 1, 2 and 3 are diagrams of different fluid delivery systems, all of which are constructed in accordance with the present invention.

In FIG. 1 a fluid delivery system is shown which is arranged for supplying measured amounts of fluid to a destination which is not illustrated in the drawings, from a reservoir 1. This destination might be chromatographic equipment or a chemical reaction system, which requires to receive an accurately measured quantity of a fluid such as a liquid reagent.

Fluid from reservoir 1 is first delivered to a receiver, in the form of a pipe 2, and this fluid is then forced out along pipe 2 to the ultimate destination by directing pressurised gas into pipe 2 from a pipe 3. Pipe 3 is connected to a source of pressurised gas not shown in the Figure, via a restrictor (not shown) to slow down the gas velocity and thus slow down the velocity of liquid movement. The gas might be an inert gas such as argon.

Pipe 2 is filled from reservoir because reservoir 1 receives pressurised gas from a pressure source (also not illustrated in the Figure) along pipe 4, and this causes the fluid to be urged out of the reservoir along a pipe 5 towards a valve 6. Valve 6 is a two-position valve capable of being switched either to connect pipe 5 to pipe 2 (dotted line position) or to connect pipe 3 to pipe 2 (full line position). When the valve is in the dotted line position, fluid from reservoir can flow along pipe 5, through valve 6, into pipe 2. When fluid flows this way and the leading edge of the fluid flowing along pipe 2 reaches a detector 7 which is capable of detecting the presence of the fluid, its presence is detected and the detector sends a signal to controller 8 to change the valve 6 into the full line position thus halting the flow from reservoir 1.

Between valve 6 and detector 7 a known amount of fluid, one unit or pulse, is then held in pipe 2. When valve 6 is changed over to the solid line position, pressurised gas from pipe 3 can flow along pipe 2 and the unit of fluid in pipe 2 will be supplied out to the right of the Figure to the required destination. The amount of fluid making up one unit depends largely on the length of the pipe between valve 6 and detector 7 but there is also a small amount of this unit of fluid associated with the valve, this amount depending on the precise construction of the valve.

When this delivery procedure is repeated units of fluid of known, equal amount will be supplied out of pipe 2 to the destination.

The amount of fluid held in pipe 2 between valve 6 and detector 7 immediately after valve 6 has changed to the full line position, that is one unit or pulse, is likely to be relatively small in relation to any single amount of fluid required to be supplied to the destination, so that the required amount of fluid will be supplied in a series of units; these will, however, be supplied quite quickly.

The controller 8 records various statistics about the system whilst it operates, including the time taken for the pressurised gas to move fluid from the reservoir 1 to form a unit in line 2. Thus, when the volume of fluid required to be supplied is not an exact multiple of one unit of fluid, the controller 8 will cause the system to supply a series of units until the amount of liquid left to be supplied is less than the volume of one unit. Controller 8 will then hold valve 6 in the broken line position for a time needed to make up the required supply, calculated by the controller 8 on the basis of having measured the time taken to supply the previous unit of fluid. This part-unit will then be supplied to the destination by switching valve 6 over.

Alternatively, the controller 8 can make a supply of an amount of fluid significantly larger than one unit by using the measurement of the time needed to supply one unit and holding valve 6 in the broken line position for a time calculated to supply the larger amount of fluid required. If, on the other hand, the amount of fluid required to be supplied to the destination is less than one unit, the measurement of the time needed to supply one unit can first be determined by actually directing one unit of fluid into pipe 2 from reservoir 1 and then passing this fluid to a waste (not shown). A part-unit can then be directed into pipe 2, measured on the basis of time, and this part-unit finally supplied to the ultimate destination.

The gas used to pressurise the reservoir I and to sweep out pipe 2 will obviously be immiscible with the fluid to be delivered. It will be appreciated that the same amount of fluid will be held in pipe 2 on each operation to direct a full unit of fluid into pipe 2, i.e. one unit of fluid, and that this amount of fluid will be taken from reservoir 1 in each delivery, i.e. there will be no waste or loss of fluid associated with the delivery of a full unit.

In the case of fluids being supplied to chromatographic equipment or to a chemical reaction system, different reagents may be required and reservoir 1 can be a reagent bottle. In this case, the reagent bottle can be changed between each delivery to facilitate the supply of different reagents.

The delivery system will work satisfactorily with reagents of different viscosity because the system measures volume and is unaffected by operating on liquids of different viscosity. In addition, fluctuations in ambient temperature and pressure of the delivery gases will not affect the accuracy of delivery of the system because full units are metered out by volume and part-units are supplied by time based on measurements taken at the current ambient temperature and system pressure.

Pipe 2 is a narrow bore tube having a known, uniform cross-section and so the volume of a unit is determined by the length of the pipe from valve 6 to detector 7.

Before delivery of a series of units of fluid, gas would be allowed to flow from pipe 3, with the valve in the full line position, to purge line 2 of any trace of reagent from a previous delivery. Valve 6 would be switched to the dotted line position to allow fluid to flow from the reservoir 1 up to detector 7; valve 6 would then be switched to the full line position to supply this unit of fluid. If, for example, the required volume were 0.5 ml and the volume of a unit were 0.2 ml, two units would be supplied, each of 0.2 ml, and then valve 6 would be held in the dotted line position for the time required to supply one half-unit, calculated by the controller 8 on the basis of having measured the time taken to supply the previous unit of fluid, to make up the remaining 0.1 ml.

Figure 2:
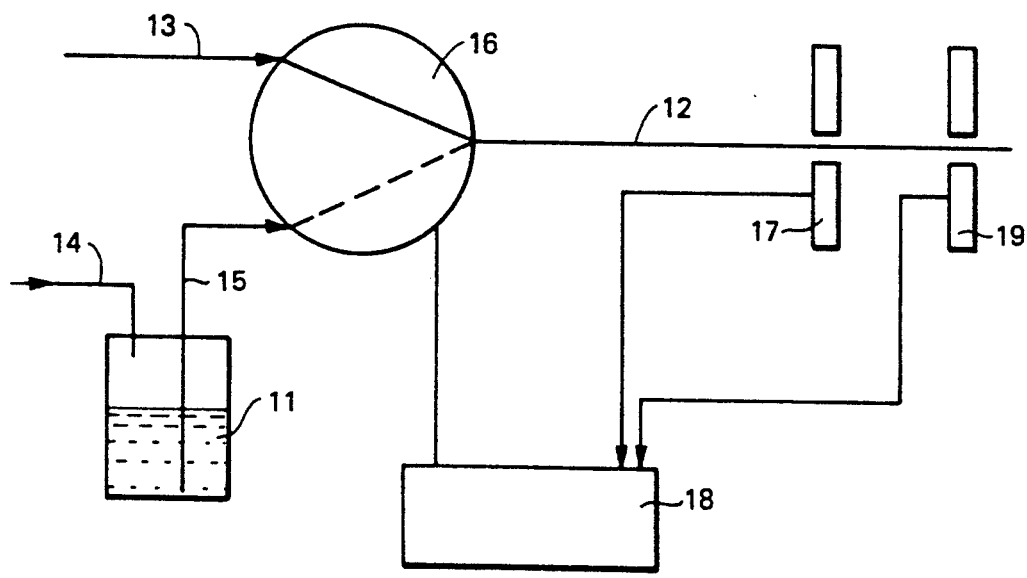

In FIG. 2 a fluid delivery system is shown which is very similar to the arrangement of FIG. 1.

In the system of FIG. 2, fluid from reservoir 11 is first directed into a receiver, in the form of a pipe 12, and this fluid is then forced out along pipe 12 to the ultimate destination (not shown) by directing pressurised gas into pipe 12 from a pipe 13. Pipe 13 is connected to a source of pressurised gas which is not illustrated in FIG. 2 but which might be a source of pressurised inert gas such as argon.

Pipe 12 is filled from reservoir 11 because reservoir 11 receives pressurised gas from a pressure source (also not illustrated in the Figure) along pipe 14, and this causes the fluid to be urged out of the reservoir along a pipe 15 towards a valve 16. Valve 16 is a two-position valve capable of being switched either to connect pipe 15 to pipe 12 (dotted line position) or to connect pipe 13 to pipe 12 (full line position). When the valve is in the dotted line position, fluid from reservoir 11 can flow along pipe 15, through valve 16, into pipe 12. When fluid flows this way and the leading edge of the fluid flowing along pipe 12 reaches a detector 17, its presence is detected and the detector sends a signal to controller 18 to change the valve 16 into the full line position thus halting the flow from reservoir 11.

Between valve 16 and detector 17 a known amount of fluid, one unit, is then held in pipe 12. When valve 16 is changed over to the solid line position, pressurised gas from pipe 13 can flow along pipe 12 and the unit of fluid in pipe 12 will be supplied out to the right of FIG. 2 to the required destination.

When this procedure is repeated units of fluid of known, equal amount will be supplied out of pipe 12 to the destination.

As with the system of FIG. 1, the amount of fluid held in pipe 12 between valve 16 and detector 17 immediately after valve 16 has changed to the full line position, that is one unit, is likely to be relatively small in relation to any single amount of fluid required to be supplied to the destination, so that the required amount of fluid will be supplied in a series of units; these will, however, be supplied quite quickly. The gas used to pressurise the reservoir 11 and to sweep out pipe 12 will be immiscible with the fluid to be delivered.

In the system of FIG. 2, a second detector 19 is positioned along pipe 12, in this case further along pipe 12 from valve 16. When this detector 19 is used (instead of detector 17) and fluid allowed to flow along pipe 12 to be detected by it, a larger unit of fluid is held in pipe 12 than when detector 17 is used. By using two detectors positioned at different distances along pipe 12 from valve 16, units of two different sizes can be produced for delivery. Also, if the detectors are placed close one to the other then the velocity and liquid volume delivery can be measured based on the information received by the controller 18.

The controller 18 records various statistics about the system whilst it operates. Thus, when the volume of fluid required to be supplied is not an exact multiple of one or other of the two available units of fluid, the controller 18 can cause the system to supply a mixture of units. If this cannot give the precise amount of liquid required to be supplied, the controller can make up the required delivery with a part-unit as described above.

Figure 3:
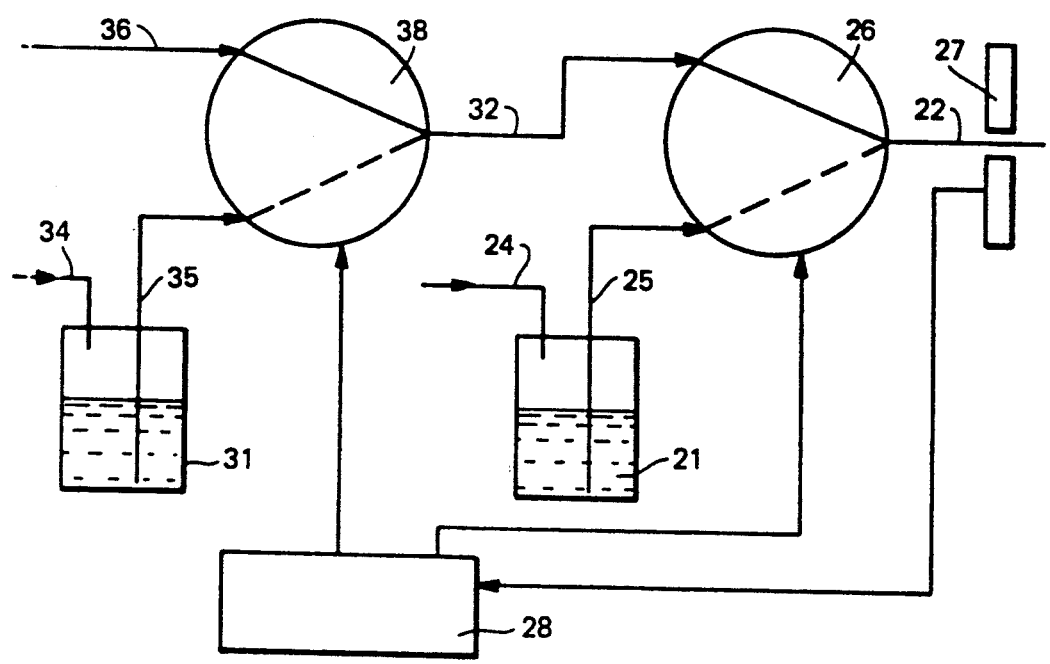

In FIG. 3 a fluid delivery system is shown which is very similar to the arrangements of FIGS. 1 and 2.

In the system of FIG. 3, fluid from two reservoirs 21 and 31 (there could be more than two), which contain different fluids, can be supplied in desired proportions to the ultimate destination. Fluid from reservoir 21 can be delivered to a receiver, in the form of pipe 22, held between valve 26 and detector 27, thus forming a unit of fluid, and supplied to the ultimate destination by switching valve 26 to the full line position and directing pressurised gas from a source (not shown) along pipe 36, through valve 38, pipe 32, through valve 26 to pipe 22.

Fluid from reservoir 31 can then be delivered to a receiver, in the form of pipe 32, through valve 26 and including pipe 22. This fluid will then be held between valve 38 and detector 27 thus forming a unit of fluid, and supplied to the ultimate destination by switching valve 38 to the full line position and directing pressurised gas along pipe 36, through valve 38, along line 32, through valve 26 and pipe 22. The volume of one unit supplied by this system from reservoir 21 will obviously be different from the volume of a unit supplied by the system from reservoir 31 but by selecting the number of units to be supplied and using part-units, controller 28 will be able to cause the system to supply the required proportions of two or more different fluids.

Figure 4:
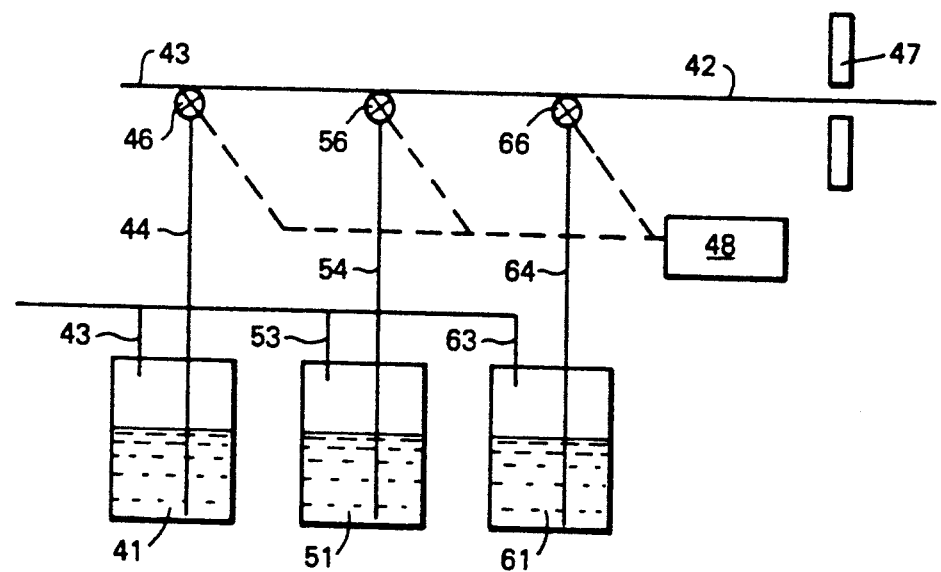
FIG. 4 is a diagram of a further embodiment of the invention.

A fluid delivery system is shown in FIG. 4 in which fluid can be supplied from three reservoirs 41, 51 and 61, (one at a time) to a destination (not specifically shown) which might be chromatographic equipment or a chemical reaction system. The reservoirs contain different liquid reagents required to be supplied in different proportions to the destination.

Fluid from any one of the three reservoirs 41, 51, 61, is first directed into a receiver, which is in the form of a pipe 42, to form a unit of this fluid and this fluid unit is then forced out along pipe 42 to the ultimate destination by directing pressurised gas into pipe 42 along a pipe 43. Pipe 43 is connected to a source of pressurised gas, via a restrictor (not shown) to slow down the gas velocity and restrict the velocity of liquid movement.

The gas source is not illustrated in the Figure but can be a source of pressurised inert gas such as argon.

In operation, pipe 42 is first purged by passing inert gas along it from the gas source and the gas pressure in the pipe is allowed to exhaust to atmosphere. The pipe 42 is then filled from one of the reservoirs 41, 51, 61, which receive pressurised gas from a pressure source (also not illustrated in the Figure) along respective pipes 43, 53, 63 and this causes the fluid to be urged out of the respective reservoirs along pipes 44, 54, 64 towards respective valves 46, 56, 66. When one of the valves 46, 56, 66 is opened fluid is forced out of the corresponding reservoir to fill pipe 42 until the leading edge of the fluid flowing along pipe 42 reaches a detector 47 and its presence is detected. The detector then sends a signal to a controller 48 to close the respective valve 46, 56, 66 thus halting the flow from the corresponding reservoir.

Pipe 42 then holds a known amount of fluid, one unit or pulse. With the valve (46, 56, 66) then closed, pressurised gas from pipe 43 can flow along pipe 42 and the unit of fluid in pipe 42 will be supplied out to the right of the Figure to the required destination and pipe 42 purged of the fluid. The gas used to pressurise the reservoirs and to sweep out pipe 42 will be immiscible with the fluid.

The distances from valves 46, 56 and 66 to the detector 47 are all different and so the volume of one unit supplied from one reservoir will differ from that supplied from the others. This difference is taken into account by the controller 48 when supplying a required volume of a fluid from a reservoir.

FIG. 5 shows in more detail a reservoir 71, similar to one of the reservoirs of FIG. 4. Fluid can be delivered along a small diameter pipe 75 from reservoir 71 through an on-off valve 76 to a receiver pipe 72, which is of larger diameter than pipe 75. As an alternative, valve 76 could be a change-over valve arranged as shown in any of FIGS. 1 to 3, and this would prevent any small amount of liquid from travelling from valve 76 towards valve 73.

Also the arrangement of FIG. 5 allows a series of reservoirs to be connected at different positions along receiver pipe 72 (although only one such reservoir is shown connected in the Figure) so that units of different fluids can be supplied to the same destination whilst the delivery amounts are measured by the same apparatus. The arrangement allows large volumes of different fluids to be supplied to the same destination from a series of different fluid containers without cross-contamination. The volume of each delivery is accurately controlled on the basis of an initial measurement of a unit made in a predetermined volume which is unaffected by temperature and pressure variations.

In FIG. 5, when a delivery of fluid is required, valve 73 is opened to purge pipe 72 and then closed so that the pressure in receiver pipe 72 falls to atmosphere. Valve 76 is then opened and fluid from the reservoir 71 is directed along pipe 75 to flow into pipe 72. The fluid flows to the right as seen in the drawing, along pipe 72 until its presence is detected by detector 77; controller 78 then closes valve 76 and the fluid then in pipe 72 up to the detector 77, constitutes one unit or pulse of fluid ready to be supplied to the ultimate destination when gas pressure is supplied from the left by opening valve 73.

When the fluid flows along pipe 75 and enters pipe 72 it will tend to flow in both directions (left as well as right, as shown in FIG. 5) along pipe 72. By selecting the cross-sectional areas of the two pipes 72 and 75 such that pipe 75 is small in cross-section in relation to pipe 72, it has been found that the fluid will flow substantially only to the right. The cross-sectional area of pipe 75 is about one-third of that of pipe 72.

As fluid begins to flow from pipe 75 into pipe 72, the front face of the advancing liquid tends to break up and bubbles of gas are entrained in the fluid. These occur firstly, as the leading edge of the fluid enters pipe 72 and secondly in pipe 72 where the fluid flow is cut off by the closing of valve 76. In order to make allowance for the entrainment of gas bubbles in the unit of fluid, the system determines how much of the fluid unit is made up of bubbles. In the simplest format, this is done by detector 77 reacting to the leading and trailing edges of bubbles passing it and the controller 78 calculating the 'length' of the bubbles and subtracting it from the 'length' of the fluid. The controller ignores bubbles which are at the trailing edge of the unit of fluid, as it can be assumed that the bubbles were formed due to the liquid travelling through the tube 72 or due to the disturbances that can be generated by the action of the valve 76 closing and these can be ignored.

FIG. 5 shows the leading and trailing edges of a fluid unit and illustrates the bubbles at both of these areas. In FIG. 6 bubbles 80 at the leading edge of the fluid unit are converted into a step function from which a sum can be calculated representing the actual fluid delivery. Bubbles 81 at the trailing edge of the fluid unit are not taken into account in the step function, as mentioned above, and the detector 77 is able to recognise the long, uninterrupted centre part 82 of the step function and the controller 78 disables the detector as soon as part 82 is detected so that bubbles 81 which pass it thereafter are ignored.

We claim:

1. A fluid delivery system comprising fluid reservoir means for containing a first fluid;
    a pipe or tube; and
    control means including
        a valve connected between said reservoir means and said pipe or tube, said valve controlling the flow of fluid from said fluid reservoir to said pipe or tube; and
        detector means for detecting the arrival of a leading end of said first fluid at a position along said pipe or tube corresponding to the delivery of a unit or pulse of said first fluid to said pipe or tube, said valve being closed upon detection of said first fluid by said detector means, the amount of fluid disposed between said valve and said detector means representing one unit or pulse; and
    means for supplying a required amount of said first fluid to a destination as a multiple of one such unit or pulse.

2. A fluid delivery system as claimed in claim 1 wherein said detector cooperates with the valve for controlling the amount of the delivery of said first fluid from said reservoir to said receiver to a unit or pulse of said fluid.

3. A fluid delivery system as claimed in claim 1, wherein said control means further includes a controller for measuring a function of the delivery of a unit or pulse of said first fluid from said reservoir means to said pipe or tube.

4. A fluid delivery system as claimed in claim 1 wherein said control means further includes a controller for measuring a function of the delivery of a unit or pulse of said first fluid from said reservoir means to said pipe or tube, and wherein the required amount of fluid is supplied as a multiple of the measured function of the delivery of one such unit or pulse plus a part pulse delivered as a proportion of the measured function of the delivery of one such unit or pulse.

5. A fluid delivery system as claimed in claim 1 wherein said control means further includes a controller for measuring a function of the delivery of a unit or pulse of said first fluid from said reservoir means to said pipe or tube, and wherein an amount of fluid less than one pulse is supplied as a part pulse delivered as a proportion of the measured function of the delivery of one such unit or pulse.

6. A fluid delivery system as claimed in claim 3 wherein said measured function is the time taken to deliver one such unit or pulse of said first fluid from said reservoir to said pipe or tube.

7. A fluid delivery system as claimed in claim 1 wherein said detector means includes a plurality of fluid detectors, each of said fluid detectors providing a unit or pulse of a size different from that provided by any other detector.

8. A fluid delivery system as claimed in claim 1, including a second fluid for supplying the unit or pulse of first fluid to the destination by forcing it out of the pipe or tube.

9. A fluid delivery system as claimed in claim 8, wherein the second fluid is an inert gas.

10. A fluid delivery system as claimed in claim 1, wherein said fluid reservoir means includes a plurality of fluid reservoirs each capable of containing a different first fluid, a pipe or tube for each such reservoir, means for directing a respective first fluid from each said third reservoir into its respective pipe or tube, means for controlling the amount of the first fluid directed into each said pipe or tube to a respective unit or pulse of said first fluid, and means for supplying a required amount of a mixture of said first fluids in required proportions from said reservoirs to a destination, as respective multiples of said units or pulses.

11. A fluid delivery system as claimed in claim 10, wherein the volume of the unit or pulse of any one pipe or tube is different from the volume of the unit or pulse of any other pipe or tube.

12. A fluid delivery system as claimed in claim 1 wherein the amount of first fluid displaced from the fluid reservoir means to facilitate delivery of a unit or pulse is no more than said unit or pulse.

13. A fluid delivery system as claimed in claim 8, wherein said control means includes a controller for detecting gas bubbles in said first fluid in the pipe or tube to differentiate between liquid and gas and to determine the volume of liquid in said unit or pulse.

14. A fluid delivery system as claimed in claim 13, wherein the controller includes an allowance, the amount of which depends on the type of valve in use, used in determining the volume of liquid in said unit or pulse.

* * * * *